United States Patent [19]

Meitner

[11] 4,298,649
[45] Nov. 3, 1981

[54] NONWOVEN DISPOSABLE WIPER

[75] Inventor: Gary H. Meitner, Winneconne, Wis.

[73] Assignee: Kimberly-Clark Corporation, Neenah, Wis.

[21] Appl. No.: 110,095

[22] Filed: Jan. 7, 1980

[51] Int. Cl.³ .............................................. B32B 5/12
[52] U.S. Cl. ................................... 428/198; 428/212; 428/219; 428/286; 428/288; 428/315
[58] Field of Search ............... 428/198, 286, 288, 315, 428/212, 219

[56] References Cited

U.S. PATENT DOCUMENTS

| | | | |
|---|---|---|---|
| 3,477,084 | 11/1969 | Thomas | 428/198 |
| 3,485,705 | 12/1969 | Harmon | 428/198 |
| 3,795,571 | 3/1974 | Prentice | 428/198 |
| 3,811,957 | 5/1974 | Buntin | 428/198 |
| 3,837,995 | 9/1974 | Floden | 428/198 |
| 3,978,185 | 8/1976 | Buntin | 428/198 |
| 4,042,740 | 8/1977 | Krueger | 428/138 |
| 4,085,175 | 4/1978 | Keuchel | 428/224 |
| 4,103,058 | 7/1978 | Humlicek | 428/171 |

OTHER PUBLICATIONS

Wente, "Superfine Thermoplastic Fibers", Industrial and Engineering Chemistry, vol. 48, No. 8, pp. 1342-1346, Aug., 1956.

Primary Examiner—Marion McCamish
Attorney, Agent, or Firm—William D. Herrick; Howard Olevsky; Wendell K. Fredericks

[57] ABSTRACT

Nonwoven disposable wiper intended primarily for industrial applications and having a reduced tendency to accumulate metal chips or other small, sharp foreign objects. The wiper results from a combination of a meltblown microfiber web laminated to at least one web of interconnected aligned split filaments, such as a fibrillated thermoplastic film or foam. The combination is pattern bonded and includes a surfactant for improved wiping properties. The combination of the split flamentary web and microfiber web results in increased safety since injuries due to metal chips picked up by the wiper material are minimized. This is accomplished without significant deterioration of the wiping properties of the meltblown material.

8 Claims, 3 Drawing Figures

NONWOVEN DISPOSABLE WIPER

BACKGROUND OF THE INVENTION

1. Field of the Invention

This invention relates to disposable wiper products used primarily in industrial applications such as print shops, automobile manufacturing and rapair facilities, and metal fabrication plants. Procedures employed in these applications require a large quantity of wiping products for finishing, clean-up, and other operations. Many of these steps involve hand applications, particularly where polishes and other protective finishes are applied. Furthermore, a large number of wipers are used in personnel clean-up involving hand and face contact. For all these uses and others there are available a wide variety of wiping products including cloth, nonwoven, and paper materials.

In many of these applications, the wipers come in contact with metal chips resulting from machining operations, cutting and other procedures. Particularly with respect to cloth and nonwoven fibrous wipers, these metal chips tend to become entangled and embedded in the wiper frequently resulting in facial and hand cuts and abrasions of personnel subsequently using the wiper. Even laundering of cloth wipers in many cases fails to completely remove metal chips. These chips, furthermore, are particularly troublesome in finishing operations where their presence will many times produce scratching or otherwise marring the surface being finished.

Accordingly, it is desired to produce a wiping material having a reduced tendency to pick up metal chips and produce the above-described undesired results. Further, such a wiper having the added convenience of disposability and wiping characteristics of meltblown materials is desired.

2. Description of the Prior Art

U.S. Pat. No. 3,485,705 to Harmon describes a nonwoven fabric formed by combining a fabrillated film with a "standard fibrous web". The combination may be bonded by adhesive or patterned application of heat if thermoplastic fibers are used. Uses for the products are described including "wiping purposes". No examples of wiper materials are given nor is there any suggestion of meltblown microfiber webs. Further, there is no discussion of wiping properties.

An alternative method and apparatus for forming webs of aligned, split filaments suitable for use in the present invention is described in U.S. Pat. No. 4,085,175.

The preparation of polyolefin microfiber webs is also known and described, for example, in Wendt, *Industrial and Engineering Chemistry*, Volume 48, Number 8 (1956) pages 1342 through 1346 as well as in U.S. Pat Nos. 3,978,185 to Buntin et al, 3,795,571 to Prentice and 3,811,957 to Buntin. The Buntin et al patent further discloses that mats of meltblown polyolefins are useful in wiping cloths and hydrocarbon absorption materials. However, these publications fail to disclose combinations of meltblown webs with fibrillated films or the improvements that may be obtained thereby.

Copending and coassigned U.S. patent application Ser. No. 001,744 to Meitner filed Jan. 8, 1979 and entitled "Microfiber Oil and Water Wipe", abandoned and refiled as Ser. No. 170,904 on July 21, 1980, describes a surfactant treated, meltblown, pattern bonded wiper having improved wiping characteristics.

SUMMARY

The present invention is directed to a unique, low cost, disposable wiper having the unexpected benefit that the tendency to accumulate metal chips is reduced while maintaining highly effective wiping properties. The result is a wiper with a high degree of performance for wiping both oily and aqueous materials having, in addition, a minimized risk of injury to personnel resulting from cuts and abrasions caused by accumulated metal chips.

The wiper of the invention is formed by combining a meltblown nonwoven web of microfibers having a basis weight in the range of from about 0.5 oz/yd$^2$ to 6 oz/yd$^2$ including fibers of an average diameter in the range of up to about 10 microns with a web of split filaments such as a fibrillated thermoplastic film or foam forming a network of fine interconnected fibers. The combination is bonded by pattern calendaring and preferably contains an ionic or nonionic surfactant in the amount of about 0.1% to 1.0% by weight. The resulting wiper product finds particular application in industrial operations where contact with metal chips is likely to occur. Many other applications will be apparent to those skilled in the art.

DESCRIPTION OF THE PREFERRED EMBODIMENTS

Figure 1:
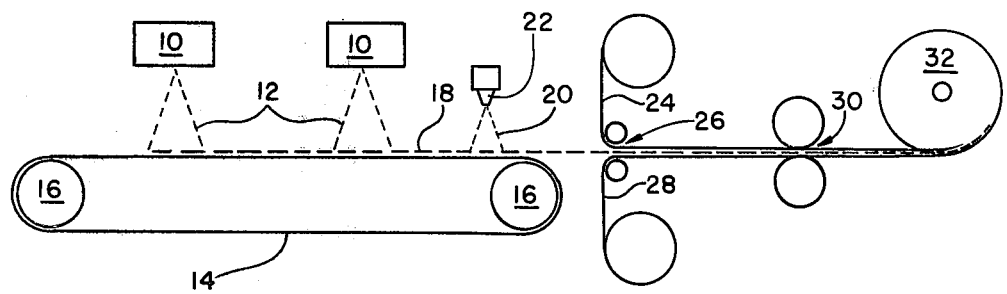
FIG. 1 is a schematic illustration of the steps in a process for making the wipers of the present invention.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Meltblown webs produced for the wipers of the present invention are preferably manufactured in accordance with the process described in U.S. Pat. No. 3,978,185 to Buntin et al which is incorporated herein by reference in its entirety and to which reference may be made for details of the meltblowing process. While the examples herein were carried out with polypropylene, it will be understood that the invention is not limited thereto and that other thermoplastic polymers capable of meltblowing, including polyethylene, polyesters, and polyamides may be utilized as well.

The split filamentary webs may be produced as described in U.S. Pat. No. 4,085,175 resulting in filament orientation at desired angles to the machine direction. Similarly, fibrillated foams may be produced from orientable crystalline polymers as described in U.S. Pat. No. 4,085,175. These include synthetic, organic polymers usually having a high molecular and long chain molecular structure such as polyolefins, including polyethylene and polypropylene, polyamides, polyesters, polyurethanes, polyacrylics, polyvinyl chloride, polyvinyl acetate, and including copolymers of such compounds and mixed polymers of such compounds. It is important, however, that the components of the meltblown and split filamentary web layers be compatible and capable of bonding by heat and pressure. Preferably, both layers are composed of the same or substantially similar materials.

Fibrillated film webs may be also produced by forming a film of such polymers and subjecting it to a high degree of uniaxial orientation. Splitting forces such as brushing, ultrasonics or any repetitive force applied to the highly oriented film in one direction cause it to fabrillate or disrupt into many small fibers mutually interconnected throughout the layer. The forces must not be so extreme as to disintegrate the film into a mass of fibers but sufficient to spread the film into fibers leaving the fibers interconnected so that an integral sheet is produced with the fibers substantially aligned in a direction opposite to the applied splitting forces.

As stated above, the meltblown web will have a basis weight in the range of from about 0.5 oz/yd$^2$ to 6.0 oz/yd$^2$ and preferably, in the range of from about 1.0 oz/yd$^2$ to 4.0 oz/yd$^2$. The split filamentary web will have a basis weight in the range of from about 0.1 oz/yd$^2$ to 0.6 oz/$^2$ and preferably 0.15 oz/yd$^2$ to 0.4 oz/yd$^2$ and is made up of individual filaments having an average diameter at least twice and, preferably at least three times that of the microfibers up to a maximum average diameter of about 40 microns.

Combining of the split fiber web and meltblown web components is attained preferably by patterned application of heat and pressure. The particular bonding conditions will be dependent upon the specific materials, but, in general, it is preferred to use a bond pattern employing about 20 to 250 pins per inch$^2$ for a coverage of about 5 to 25% of the surface area. The bonding temperature is preferably in the range of from about 180° F. to 245° F. with a pressure preferably in the range of from about 10 PSIG to 30 PSIG. Reference may be had to U.S. Design Pat. No. 239,566 and U.S. Pat. No. 3,855,046 for further illustrations of bonding patterns and conditions.

Preferred ionic and nonionic surfactants include dioctylester of sodium sulfosuccinic (Aerosol OT) which are preferably applied by spraying a solution of 0.3 to 2.0% by weight in water onto the bonded composite to produce a pick up in the range of from about 0.1 to 1.0% by weight, more preferably 0.2 to 0.75% by weight.

Turning to FIG. 1, a process for forming the wiper material of the invention will be briefly described. Other forming and combining operations that may be utilized will be apparent to those skilled in the art, and it is not intended to limit the invention to the operations specifically set forth.

Figure 3:
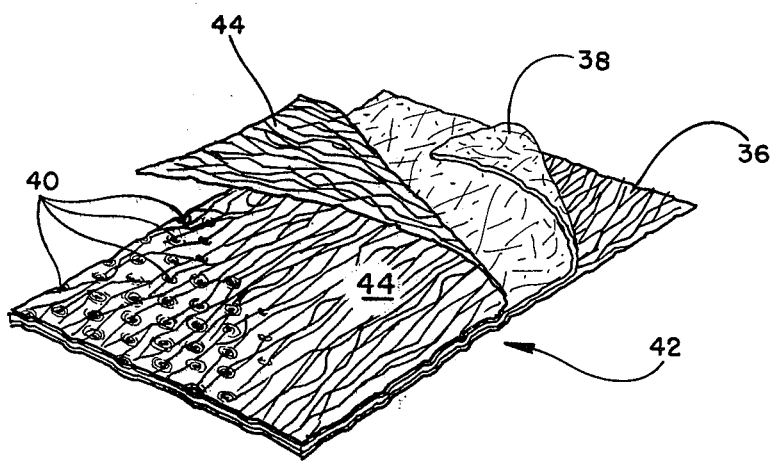
FIG. 3 is a similar view of an additional embodiment wherein both surfaces of the meltblown web have laminated thereto split filamentary web components.
Figure 2:
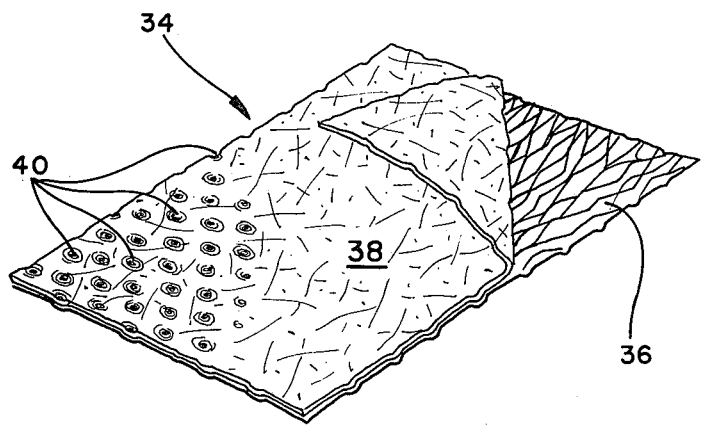
FIG. 2 is a perspective view of the laminate of the present invention with the layers partially folded away for illustrative purposes.

As shown, melt blowing dies 10, of which there may be one or more, deposit microfibers 12 onto moving wire 14 supported by rolls 16, one or more of which may be driven. A loose batt 18 is formed to which is added wetting agent 20 by spray nozzle 22. Split filamentary web 24 is combined with batt 18 and 26. If a layer of web is desired on both sides of batt 18, a second web 28 may be combined also at 26. The combination is preferably bonded by heat and pressure at patterned calendar nip 30 and wound into parent roll 32 which may be slit into individual wipers as illustrated in FIGS. 2 and 3. Turning to FIG. 2, two-ply wiper 34 is illustrated including microfiber layer 38 and split filamentary layer 36 with pattern bond areas 40. FIG. 3 is a similar view of a three-ply wiper 42 including an additional split filamentary layer 44.

The invention will now be described in terms of specific examples illustrating various embodiments.

EXAMPLE 1

A meltblown microfiber web having a basis weight of 2.0 g/yd$^2$ was formed in accordance with the process described in U.S. Pat. No. 3,978,185 to Buntin et al as follows: polypropylene resin having a melt index of 14 g/10 min., measured at 190° C. and identified as Hercules PC973 was used. Production was at a rate of 2.5 pounds per hour and collected at a distance of 14 inches on a forming screen. The meltblown filaments were integrated into a web as formed in the manner generally illustrated in FIG. 1. A split fiber foam web formed from polypropylene resin was obtained from PNC Corporation and believed to have been made in accordance with U.S Pat. No. 4,085,175. It was identified as "M.T.C. Polypropylene Web" and had a basis weight of 0.2 oz/yd$^2$ with an average fiber diameter of about 9.5 microns.

The meltblown web and split fiber web were combined by superposing the two layers and passing them through a patterned nip having 153 points per inch$^2$ and a coverage of 10.2% at a temperature of 2.0° F. and a pressure of 30 PSIG. To the interbonded composite was added by spray application a dioctylester of sodium sulfosuccinic acid (Aerosol OT) surfactant at a coverage of about 0.35% by weight. The resulting product was a very effective wiper exhibiting high absorbency for both oily and aqueous liquids and a tendency to wipe clean without streaking.

EXAMPLE 2

Example 1 was repeated except that the split fiber web was applied to both surfaces of the microfiber web prior to bonding so that the composite material had a total basis weight of 2.6 g/yd$^2$. This material also demonstrated very excellent wiping properties.

The products of Examples 1 and 2 were tested for a tendency to pick up metal chips in accordance with the following procedure: a sample was cut to 4.5 inches by 6.0 inches, weighed and attached by adhesive tape to a 4.5 inch by 5.0 inch 200 gram Lucite block. The block, including sample, was placed sample side down in a 6 inch by 12 inch by 2 inch box containing about 500 grams of metal chips and moved by hand through the chips in a back and forth motion exerting slight hand pressure over the weight of the block for about 10 seconds. The sample was reweighed and attached to a hanger in a test box. A pendulum, formed by suspending a board about 10 inches from a hinge and attaching a paddle at right angles in position to contact the sample, was lifted to a horizontal position and released to strike the sample once. The sample was reweighed, and the new weight subtracted from the previous weight of sample plus chips. The total pick-up is the second weight less the first, and retention is the second weight less the third.

For comparative purposes a sample having 2.5 oz/yd$^2$ basis weight produced as in above-mentioned Ser. No. 001,744 as well as the following conventional materials were also tested for metal chip pick-up in the same manner: KIMTEX ® disposable wipers (surfactant treated 2 1 oz/yd$^2$ polypropylene meltblown wipers), KEXTOWEL (cotton cloth having a basis weight of about 6.5 oz/yd²) WYPALL (cellulose tissue having a basis weight of about 2.5 oz/yd²).

The Table below sets forth the results of the above testing. As shown, the wiper of the present invention displays a surprisingly reduced tendency to pick up and collect metal chips and would reduce the likelihood of personnel cuts and abrasions resulting from the use of wipers containing such metal chips. The result is obtained without a significant deterioration in the wiping properties of the wiper of the invention. While the invention is not to be limited to a particular theory, it is believed that the split filament web provides less opportunity to catch on metal fragments and within fissures in the fragments.

TABLE

| SAMPLE | PICK UP (g) | RETENTION (g) |
|---|---|---|
| SN 1744 | 1.399 | 1.158 |
| Ex. 1 | 0.673 | 0.064 |
| Ex. 2 | 0.974 | 0.122 |
| Kextowel (cloth) | 3.038 | 0.356 |
| WypAll (tissue) | 0.375 | 0.035 |

Thus it is apparent that there has been provided, in accordance with the invention, a wipe material that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A nonwoven composite wiper consisting essentially of,
   (a) a web having a basis weight in the range of from about 1.0 oz/yd² to 4.0 oz/yd² of meltblown, thermoplastic polypropylene microfibers having an average diameter in the range of up to about ten microns and
   (b) on at least one side of said microfiber web a split thermoplastic foamed polypropylene filamentary web having a basis weight in the range of from about 0.1 oz/yd² to 0.6 oz/yd² comprising filaments having an average diameter at least about twice that of said microfibers up to a maximum of about 40 microns,
   said composite being pattern bonded and containing 0.1 to 1.0% by weight of a surfactant selected from the group consisting of ionic and nonionic surfactants.

2. The wiper of claim 1 wherein the split filamentary web has a basis weight in the range of from about 0.15 oz/yd² to 0.4 oz/yd².

3. The wiper of claim 1 wherein the surfactant is contained in the range of from about 0.2% by weight to 0.75% by weight.

4. The wiper of claim 1 wherein the pattern bonding is obtained by application of heat and pressure in the ranges of from about 180° F. to 245° F. and 10 PSIG to 30 PSIG employing a pattern with 20 to 250 pins per square inch covering 5 to 25% of the composite surface area.

5. The wiper of claim 1 wherein the micro-fiber web is meltblown polypropylene having a basis weight in the range of from about 1.0 oz/yd² to 4.0 oz/yd², wherein the split filamentary web is foamed polypropylene having a basis weight in the range of from about 0.15 oz/yd² to 0.4 oz/yd², wherein the surfactant is contained in the range of from about 0.2% by weight to 0.75% by weight and wherein the pattern bonding is obtained by application of heat and pressure in the ranges of from about 180° F. to 245° F. and 10 PSIG to 30 PSIG employing a pattern with 20 to 250 pins per square inch covering 5 to 25% of the composite surface area.

6. The wiper of claim 5 wherein a split filamentary web is bonded to both sides of the microfiber web.

7. The wiper of claim 1 wherein said split filamentary web is included as multiple layers, each having a basis weight in the range of from about 0.15 oz/yd² to 0.4 oz/yd².

8. The wiper of claim 7 wherein a split filamentary web is bonded to both sides of the microfiber web.

* * * * *